(12) United States Patent
Puyou et al.

(10) Patent No.: US 9,260,180 B2
(45) Date of Patent: Feb. 16, 2016

(54) AUTONOMOUS AND AUTOMATIC LANDING METHOD AND SYSTEM

(71) Applicant: AIRBUS OPERATIONS (S.A.S.), Toulouse (FR)

(72) Inventors: Guilhem Puyou, Toulouse (FR); Victor Gibert, Lanta (FR); Fabien Perrin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/339,220

(22) Filed: Jul. 23, 2014

(65) Prior Publication Data

US 2015/0032299 A1   Jan. 29, 2015

(30) Foreign Application Priority Data

Jul. 24, 2013   (FR) ...................................... 13 57288

(51) Int. Cl.
| | |
|---|---|
| G06K 9/00 | (2006.01) |
| B64C 13/16 | (2006.01) |
| G08G 5/02 | (2006.01) |
| G05D 1/06 | (2006.01) |

(52) U.S. Cl.
CPC .............. *B64C 13/16* (2013.01); *G05D 1/0676* (2013.01); *G08G 5/025* (2013.01)

(58) Field of Classification Search
USPC ............ 701/16, 14, 1, 18, 28, 4, 514; 342/33, 342/63; 73/178 T; 244/183; 382/106; 348/119; 340/951
See application file for complete search history.

(56) References Cited

U.S. PATENT DOCUMENTS

| | | | |
|---|---|---|---|
| 6,952,632 B2 | 10/2005 | Robert et al. | |
| 2003/0225487 A1* | 12/2003 | Robert | ................ G05D 1/0676 701/4 |
| 2005/0075761 A1 | 4/2005 | Kubica | |
| 2005/0125142 A1 | 6/2005 | Yamane | |
| 2008/0071431 A1 | 3/2008 | Dockter et al. | |

FOREIGN PATENT DOCUMENTS

| | | |
|---|---|---|
| CN | 101 109 640 A | 1/2008 |
| EP | 1 335 258 A1 | 8/2003 |
| FR | 2 735 445 A1 | 12/1996 |
| FR | 2 835 314 A1 | 8/2003 |

(Continued)

OTHER PUBLICATIONS

French Search Report for Application No. 1357288 dated Apr. 11, 2014.

(Continued)

*Primary Examiner* — Adam Tissot
(74) *Attorney, Agent, or Firm* — Jenkins, Wilson, Taylor & Hunt, P.A.

(57) ABSTRACT

A system and method are disclosed for automatic landing of an aircraft on a landing runway, including an on-board video camera intended to take images of the ground, image processor to extract from these images visual features of the landing runway, guidance system determining guidance commands of the aircraft to bring it into a nominal approach plane and to align it with the axis of the landing runway, from the respective positions of the visual features of the landing runway, in at least one of the images, where the guidance commands are supplied to a flight control computer.

10 Claims, 7 Drawing Sheets

(56) References Cited

FOREIGN PATENT DOCUMENTS

| GB | 2 302 318 A | 1/1997 |
|---|---|---|
| WO | WO 2014/075657 | 5/2014 |

OTHER PUBLICATIONS

Farineau—"Lateral electric flight control laws of the A320 based upon eigenstructure assignment techniques" Proceedings of the AIAA GNC Conference, 2004.

Le Bras, Florent et al., "Approach Maneuvers for Autonomous Landing Using Visual Servo Control," IEEE Transactions on Aerospace and Electronic Systems, Apr. 2014, p. 1051-1065, vol. 50, No. 2, IEEE.

Miller, A. et al., "Landing a UAV on a runway using image registration," IEEE International Conference on Robotics and Automation, 2008, pp. 182-187, IEEE, Pasadena, CA, USA.

French Search Report for Application No. 14 57208 dated Jun. 1, 2015.

\* cited by examiner

AUTONOMOUS AND AUTOMATIC LANDING METHOD AND SYSTEM

TECHNICAL FIELD

The subject matter disclosed herein relates, generally, to the field of aeronautics, and more specifically to that of automatic landing systems and methods.

BACKGROUND

The landing phase is a critical phase in the flight of an aircraft, since it is during this phase that most incidents and accidents occur. To facilitate the pilots' task many automatic landing systems have been proposed. In particular the ILS (Instrument Landing System) fitted to large-capacity airliners is well known and its ground infrastructure is present in international airports. MLS (Microwave Landing System) is also available in some European airports. These systems use radio or microwave signals to guide the aircraft in its approach phase both laterally, relative to the axis of the runway, and vertically, relative to the glide path. However, they have the disadvantage that they are not available in all airports, notably due to their high costs, and the fact that they have major usage constraints. In addition, the ground infrastructure has a malfunction probability of the order of $10^{-3}$/hour. Aircraft cannot therefore be certain that they will be able to land in automatic mode. More recently automatic landing systems have been produced which use a satellite positioning system called GLS (GPS Landing System), or alternatively SLS (Satellite-based Landing System). Since current satellite positioning systems do not enable the precision required to make a landing to be obtained, these systems must be augmented by ground reference stations such as those of the WAAS (Wide Area Augmentation System) or EGNOS (European Geostationary Navigation Overlay Service) network. The systems are as yet not widespread, and have a relatively low availability rate (of the order of 99.5%) which, again, does not enable landing in automatic mode to be guaranteed permanently.

Due to the spatial and time-related unavailability of such ground infrastructures, attention has turned to autonomous landing systems, using video images of the ground taken by an on-board camera.

These autonomous systems generally use the video images taken by the camera and data relative to the runway to judge the pose of the camera (pose estimation), and to deduce from it the attitude and position of the aircraft relative to the runway. The aircraft's guidance commands are then calculated from the position and the attitude determined in this manner. However, the pose estimate is a complex operation, which generally requires that an on-board digital model of the topography of the airport is available, or at least geometrical and topographical data relating to the landing runway. In addition, when the database containing the digital model is unavailable, or in the event of an emergency landing on a random terrain, the abovementioned autonomous systems are inoperative.

French Patent Application FR-A-2835314, co-owned herewith, discloses a landing assistance system that does not require the features of the landing runway to be known. However, this system operates only when the aircraft is a few meters from the ground and does not enable the aircraft to be guided throughout the final approach, i.e. during the final ten kilometers approximately.

The object of the subject matter disclosed herein is to propose an automatic landing system for an aircraft which is particularly robust, and is able to operate with total or partial absence of data relating to the landing runway, and to guide it autonomously throughout the final approach.

SUMMARY

The subject matter disclosed herein comprises a system for automatic landing of an aircraft on a landing runway including:
  at least one on-board video camera on board the aircraft, intended to take a series of successive images of the ground;
  image processor able to extract from the images visual features of the landing runway;
  guidance system able to determine guidance commands for the aircraft to bring it into a nominal approach plane and to align it with the axis of the landing runway, from the respective positions of the visual features of the landing runway in at least one of the images.

The aircraft's guidance commands during the approach phase are thus determined only on the basis of the positions of the visual features of the runway in the image, and do not require knowledge of its geometric and/or topographical data.

In a first embodiment the guidance commands are obtained by image-based visual servoing of the visual features of the runway in the image.

In this first embodiment the guidance system comprises imaged-based visual servoing able to and configured to estimate a distance between the positions of the visual features and the demand positions of these elements in an image, and to deduce therefrom the guidance commands for the aircraft to bring the visual features to their respective demand positions in the image.

The visual features of the landing runway in an image are advantageously the axis of the runway and a touchdown point on the runway.

If there is no side wind the demand position of the axis of the runway is the median vertical axis of the image, and the demand position of the touchdown point is the point of intersection between the median vertical axis and the line parallel to the horizon line, located under this line at a demand distance from it.

The distance between the axis of the runway and the median vertical axis of the image is estimated by distance $d_\Omega$ separating vanishing point $\Omega$ and point of intersection H between the median vertical axis of the image and the horizon line, and angle $\theta r$ between the axis of the runway and a horizontal axis of the image.

The demand distance is preferably equal to $d_{P,c}=f \cdot (\tan(\theta+\delta_0)-\tan(\theta))$ where f is the focal distance of the camera, $\theta$ is the pitch angle of the aircraft and $\delta_0$ is the angle between the nominal approach plane and the horizontal plane.

In this case, the guidance commands for the aircraft are determined by:

$$\dot{\phi}_c = k_1 \tan(\theta_r - \theta_{r,c}) + k_2 \text{Arc}\tan(d_\Omega - d_{\Omega,c}) + k_3 \phi + k_4 \dot{\phi}$$

$$Nz_c = k_5 (d_P - d_{P,c}) + k_6 \dot{d}_P$$

where $\dot{\phi}_c$ is the demand roll speed, $Nz_c$ is the demand load factor, $\phi$ and $\dot{\phi}$ are respectively the instantaneous roll angle and roll speed of the aircraft, and $k_i$, i=1, ..., 6 are predetermined real numbers, $\theta_{r,c}=0$ and $d_{\Omega,c}$ is a set point value.

Set point value $d_{\Omega,c}$ is advantageously chosen as an increasing function of the side wind speed, and zero if such a wind is absent.

In a second embodiment the guidance commands are obtained by determining the position and relative attitude of the aircraft relative to the runway from the positions of the visual features of the runway in the image, and applying a guidance law.

In this second embodiment the guidance system can estimate the position of the aircraft relative to the runway, from the respective positions of the visual features of the runway in a first image and in a second image of the series of successive images, together with the movement of the aircraft between the point where the first image is taken and the point where the second image is taken, where the guidance system also includes a guidance computer able to calculate the guidance commands from the relative position calculated in this manner.

The movement of the aircraft between the point where the first image is taken and the point where the second image is taken is provided by an inertial unit of the aircraft.

The position of the aircraft relative to the runway can be obtained in the form of a vertical distance relative to the horizontal plane containing the runway, a longitudinal distance relative to the touchdown point along the axis of the runway, and a lateral distance relative to a vertical plane passing through the axis of the runway.

The visual features of the runway are advantageously a touchdown point P on the runway and a vanishing point of the runway, $\Omega$.

The vertical, lateral and longitudinal distances are determined respectively by:

$$\Delta z_2 = \frac{(x_2 - x_1) - (z_2 - z_1)/\tan\psi_1}{1/\tan\psi_2 - 1/\tan\psi_1}$$

$$\Delta y_2 = \frac{(x_2 - x_1) - (y_2 - y_1)/\tan\xi_1}{1/\tan\xi_2 - 1/\tan\xi_1}$$

$$\Delta x_2 = \frac{\Delta z_2}{\tan\psi_2}$$

where $x_2-x_1$, $y_2-y_1$, $z_2-z_1$ gives the movement of the aircraft in reference point $(\Gamma,x,y,z)$, between the point where the first image is taken and the point where the second image is taken, where axis $\Gamma x$ is the axis of the runway, axis $\Gamma z$ is the vertical axis and axis $\Gamma y$ is transverse to the axis of the runway, $$\tan\psi_1 = \frac{d_1^{alt}}{f}, \quad \tan\psi_2 = \frac{d_2^{alt}}{f}, \quad \tan\xi_1 = \frac{d_1^{lat}}{f}, \quad \tan\xi_2 = \frac{d_2^{lat}}{f},$$

where $d_1^{alt}$, $d_2^{alt}$ are the respective distances of point P at the horizon line in the first and second images, and $d_1^{lat}$, $d_2^{lat}$ are the respective distances of vanishing point $\Omega$ at the point of intersection of the median vertical line of the image with the horizon line, in the first and second images.

Whatever the embodiment, the image processor is able to identify at least one landing runway in an image.

According to a first variant, the landing system includes a display device to display the images of the video camera, coupled to a user interface, where the user interface enables a landing runway to be selected from multiple landing runways in an image displayed by the display device.

According to a second variant the image processor is able to determine an axis of the landing runway and a touchdown point on this runway.

The automatic landing system can include a display device to display the images of the video camera, coupled to a user interface, where the user interface enables the axis of the landing runway to be designated on the image, together with a touchdown point on this runway.

The subject matter disclosed herein also relates to a method for automatic landing of an aircraft on a landing runway including:
  the taking of a successive series of images of the ground;
  image processing software to extract from the images visual features of the landing runway;
  determination of guidance commands for the aircraft to bring it into a nominal approach plane and to align it with the axis of the landing runway, from respective positions of the visual features of the landing runway in at least one of the images.

According to a first embodiment, the determination of the guidance commands includes an image-based visual servoing step in the image to estimate a distance between the positions of the visual features and the demand positions of these elements in the image, and to deduce from them guidance commands for the aircraft to bring the visual features to their respective demand positions in the image.

According to a second embodiment the guidance commands are obtained by:
  estimating the position of the aircraft relative to the runway from the respective positions of the visual features of the runway in a first image and in a second image, together with movement of the aircraft between the point where the first image is taken and the point where the second image is taken;
  calculating the guidance commands from the relative position calculated in this manner and a guidance law of the aircraft in the approach phase.

BRIEF DESCRIPTION OF THE DRAWINGS

Other characteristics and advantages of the invention will appear on reading a preferential embodiment of the invention, with reference to the attached figures.

DETAILED DESCRIPTION

In what follows we shall consider an automatic landing system using images taken by at least one on-board video camera on an aircraft. The term "automatic landing system" is understood to mean in what follows either a system enabling the aircraft to land on the landing runway without action by the pilot (Automatic Landing System) or a system assisting the pilot (Aided Landing System) during landing. In particular, the pilot may at any time correct the commands generated by the automatic landing system, depending on the visual indications.

The automatic landing system according to the invention enables the pilot to be guided or assisted throughout the length of the final approach. It can operate as soon as a landing runway has been identified (conventional landing on an airport runway), for example by image processing, or indeed when designated by the pilot, in particular in the case of an emergency landing on an improvised runway.

Figure 1:
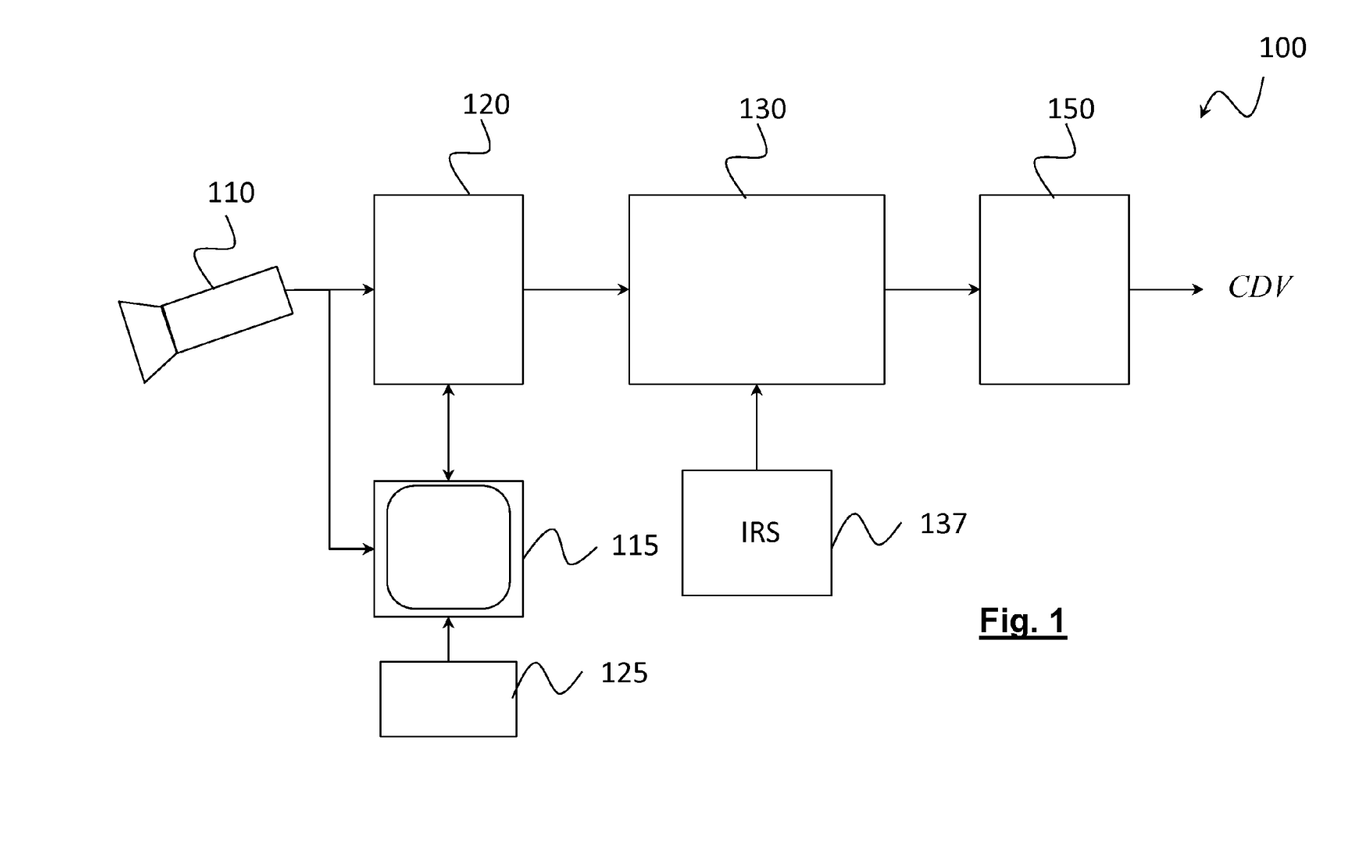
FIG. 1 represents an automatic landing system according to a first embodiment of the invention.

FIG. 1 represents schematically an automatic landing system according to a first embodiment of the invention.

Automatic landing system 100 includes at least one video camera, 110, installed on board the aircraft, able to take successive images of the ground.

The on-board camera can advantageously be a camera of an EVS (Enhanced Vision System) fitted to most aircraft of recent construction. This system generally consists of multiple sensors (IR/visible cameras, millimeter wave radar, etc.), able to give the pilot images of the ground under conditions of reduced visibility. In what follows we shall use the term "camera" for a sensor providing images in one or more spectral band(s) (visible, infrared, millimeter wave, for example).

Without loss of generality, we shall also suppose in what follows that the axis of the camera is identical to the longitudinal axis of the aircraft. Generally, the axis of the camera is located in the vertical symmetry plane of the aircraft, and can have a known angular separation $\theta_{cam}$ with the abovementioned longitudinal axis, such that it is always possible to be reduced to the previous hypothesis of a zero angular separation.

The intrinsic characteristics of the camera (in particular its focal distance) are presumed to be known. In addition, the angular position of the camera in the vertical plane of symmetry of the aircraft, i.e. angle $\theta_{cam}$ between the axis of the camera and the longitudinal axis of the aircraft, is also presumed to be known.

The aircraft may also be fitted with a pair of cameras of identical intrinsic characteristics, the axes of which are situated either side of the vertical plane of symmetry of the aircraft. This pair of cameras then enables a 3D view of the ground to be obtained, in a known manner.

Image processor 120 receives the successive images taken by the camera, extract from them visual features $VF_1, \ldots, VF_N$, of a landing runway when the runway is present, and track them within successive images.

Optionally, the image processor can detect the presence of one or more landing runway(s) present in the image, advantageously by of detection of pairs of segments as described in abovementioned application FR-A-2835314.

The visual features extracted by the image processor are provided to image-based visual servo 130, estimating the distance, within an image, between the positions of the visual features and the demand positions, and deducing from these guidance commands for the aircraft. The guidance commands are then supplied to a flight control computer, 150. In its most simple form, the automatic landing system according to the invention does not include the flight control computer itself, since the latter can simply be the fly-by-wire control system installed in the aircraft. A retrofit of the aircraft can therefore be accomplished easily without having to modify the fly-by-wire system.

The set of guidance commands defines a guidance law which the aircraft must follow during the final approach. For example, the guidance commands can be expressed in the form of an aerodynamic load factor and angular rates (roll, pitch and yaw rates). For example, the aerodynamic load factor ensures that the aircraft does indeed follow the glide path in the approach plane, and the angular rates guarantee a dynamic alignment of the aircraft relative to the runway.

Image-based visual servo 130 is, finally, coupled to IRS (Inertial Reference System) inertial unit 137. This inertial unit gives the image-based visual servo positional and attitude data of the aircraft. This positional and attitude data is, however, affected by inertial drift and, in any event, is insufficiently accurate to be able to be used directly by the flight control computer in the landing phase.

Whatever the configuration, flight computer 150 computes the controls of the actuators of the flight control surfaces from the guidance commands received from the image-based visual servo. More specifically, the flight control computer, by a control loop, causes the controls of the actuators of the flight control surfaces to be controlled by the guidance commands.

Automatic landing system 100 advantageously includes a display device 115 linked to video camera (or cameras) 110, and to image processor 120. The display device is preferably fitted with a touchscreen or user interface (mouse, thumb wheel, button etc.) 125, one purpose of which is to enable the pilot to designate a part of the displayed image. For example, the device will be able to highlight, on the image of the ground, one or more landing runways, or indeed segments or characteristic points of these runways, detected by the image processor.

Operation of the automatic landing system according to the first embodiment of the invention will be described below in relation with two separate scenarii.

According to a first scenario of preferential application of the invention, the aircraft is in sight of one or more landing runways, but has no information, or only partial information, of the characteristics of these runways, in particular their dimensions, altitude, alignment and position. This scenario covers in particular the case in which the aircraft is not equipped with a topographical database of the different airports, or the scenario in which the landing runway is not included in this database, or alternatively the scenario in which the database is unavailable (malfunction for example).

The second scenario corresponds to an emergency landing situation. No landing runway is visible to the pilot, and the pilot must then determine the area where they must land. This area constitutes an improvised landing runway, and will be considered in what follows as a conventional landing runway, except that the runway will be defined by the pilot instead of being recognised by the image processor.

In the first scenario the image processor identifies the landing runway(s) present in the current image. These runways are highlighted in the video image, as a mesh-outline or solid trapezoid shape. The pilot then approves the landing runway in the display device, or selects from those which are presented to them the one on which the aircraft is to land; this selection can subsequently be corrected if required. Alternatively, the landing runway is selected automatically from data supplied by the airport's control tower. When the landing runway has been approved or selected the image processor tracks it in the following images, using a linear prediction method, for example using a Kalman filter as described in abovementioned application FR-A-2835314 and/or using the aircraft's positional and attitude data supplied by inertial unit 137.

The detected runway can continue to be displayed in the following images at the pilot's request. By this they can check visually that the tracking is correct, or change to another landing runway, if required.

The image processor can also identify the touchdown point on the approved or selected landing runway. The touchdown point (or touchdown area) of a landing runway is signalled on the runway by specific marking (short parallel strips either side of the axis of the runway).

Figure 2:
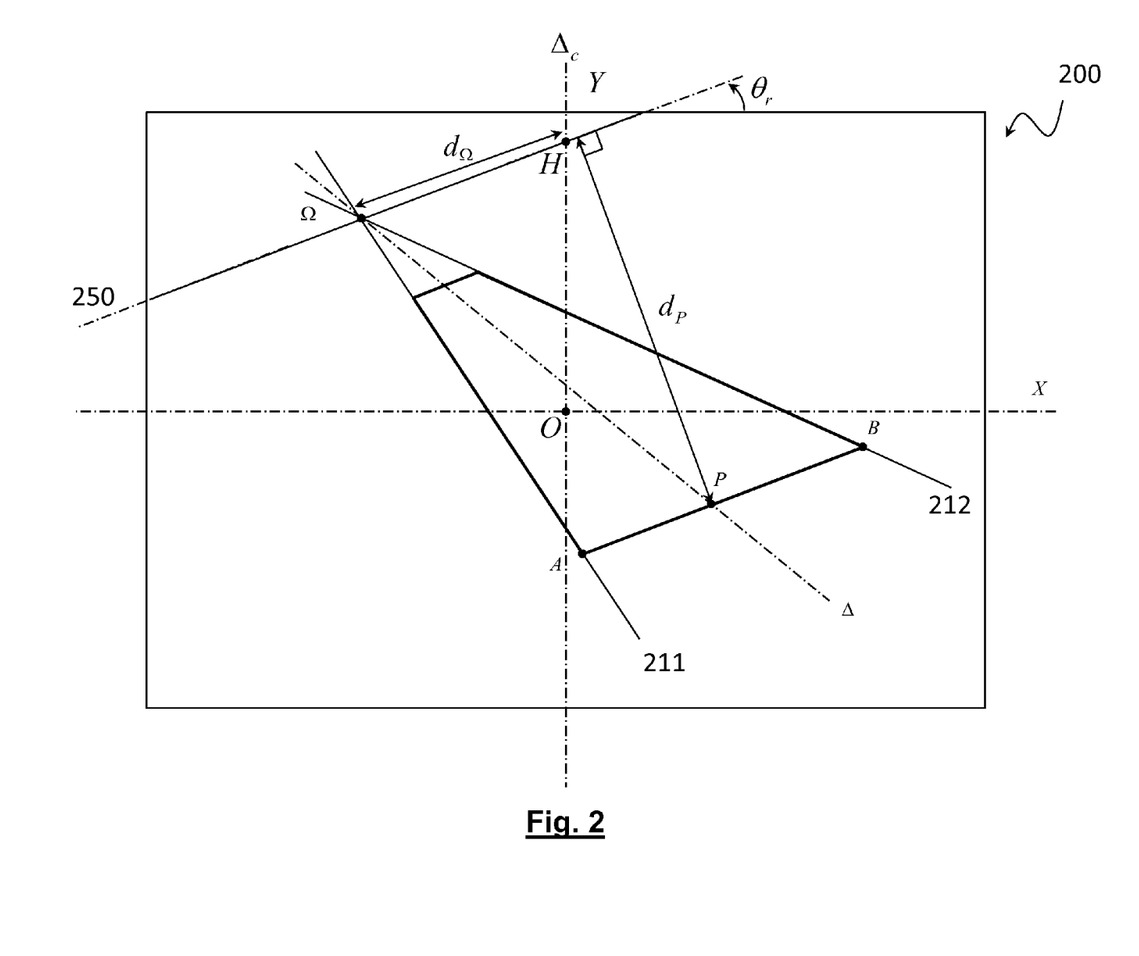
FIG. 2 represents a display screen on which a landing runway has been identified by the image processor.

When the runway has been identified the image processor extracts the visual features of the runway. These features characterise the landing runway in the image, notably its shape, position and alignment in the image. The visual features of the runway are advantageously chosen as being median line A of the runway and touchdown point P on the runway in the image, as indicated in FIG. 2. Other visual features can alternatively be chosen, for example the lines corresponding to the edges of the runway, instead of the median line, and points A and B belonging to the edges of the runway, which are symmetrical relative to touchdown point P and which are located on a line parallel to the virtual horizon.

The visual features of the runway can in all cases be highlighted on the video image at the pilot's request.

FIG. 2 represents a landing runway, identified by the image processor of the automatic landing system.

In the figure, a video image 200 containing the runway has been represented. Lines 211 and 212 which are highlighted in the image delimit the left and right edges of the runway and meet at a vanishing point $\Omega$ belonging to virtual horizon line 250. Median line $\Delta$ of the runway consequently intersects virtual horizon line also at point $\Omega$. Touchdown point P has been represented on the median line (axis of the runway), together with segment AB parallel to the virtual horizon line passing through touchdown point P.

For the requirements of the remainder of the description distance $d_\Omega$ between vanishing point $\Omega$ of the runway and point H, which is defined as the intersection between horizon line 250 with vertical axis OY of symmetry of the image, has also been noted in FIG. 2, and also distance $d_P$ from touchdown point P to horizon line 250.

The virtual horizon line is determined by the roll and pitch angles provided by inertial unit 137.

Figure 3:
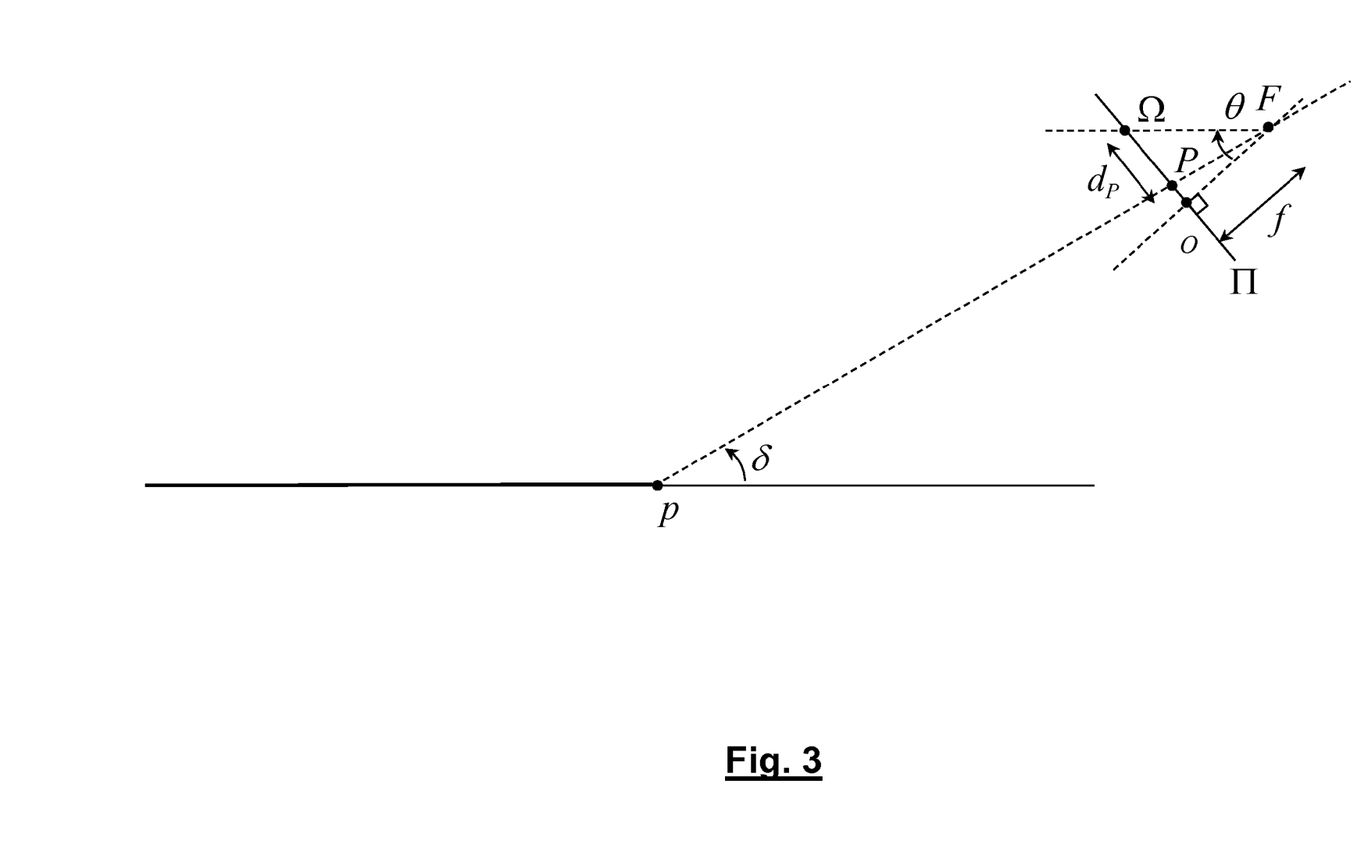
FIG. 3 illustrates the formation of the image of the landing runway in the image plane of the on-board video camera.

FIG. 3 illustrates the formation of the image of the landing runway in image plane Π of the camera. A pinhole model has been adopted for the camera and its focal point has been represented at F. It has also been presumed for the aircraft, for reasons of simplification, that the longitudinal axis was in the plane of symmetry of the runway (plane of the figure).

Vanishing point $\Omega$ (identical in this case with point H) is defined by the intersection of the horizontal line passing through F with image plane Π. It will be noted that distance $d_P$ is related to pitch angle $\theta$ of the aircraft by the following relationship:

$$d_P = f(\tan(\theta+\delta) - \tan(\theta)) \quad (1)$$

where f is the focal distance of the camera and $\delta$ is the angle between the approach plane of the aircraft and the ground. Expression (1) supposes that the axis of the camera is parallel to the longitudinal axis of the aircraft. If the camera has an angular offset $\theta_{cam}$ (counted positively downwards) with the longitudinal axis, this distance is expressed by:

$$d_P = f \cdot (\tan((\theta+\theta_{cam}+\delta) - \tan((\theta+\theta_{cam})) \quad (2)$$

As mentioned above, it will be supposed in what follows that $\theta_{cam}=0$.

Figure 4:
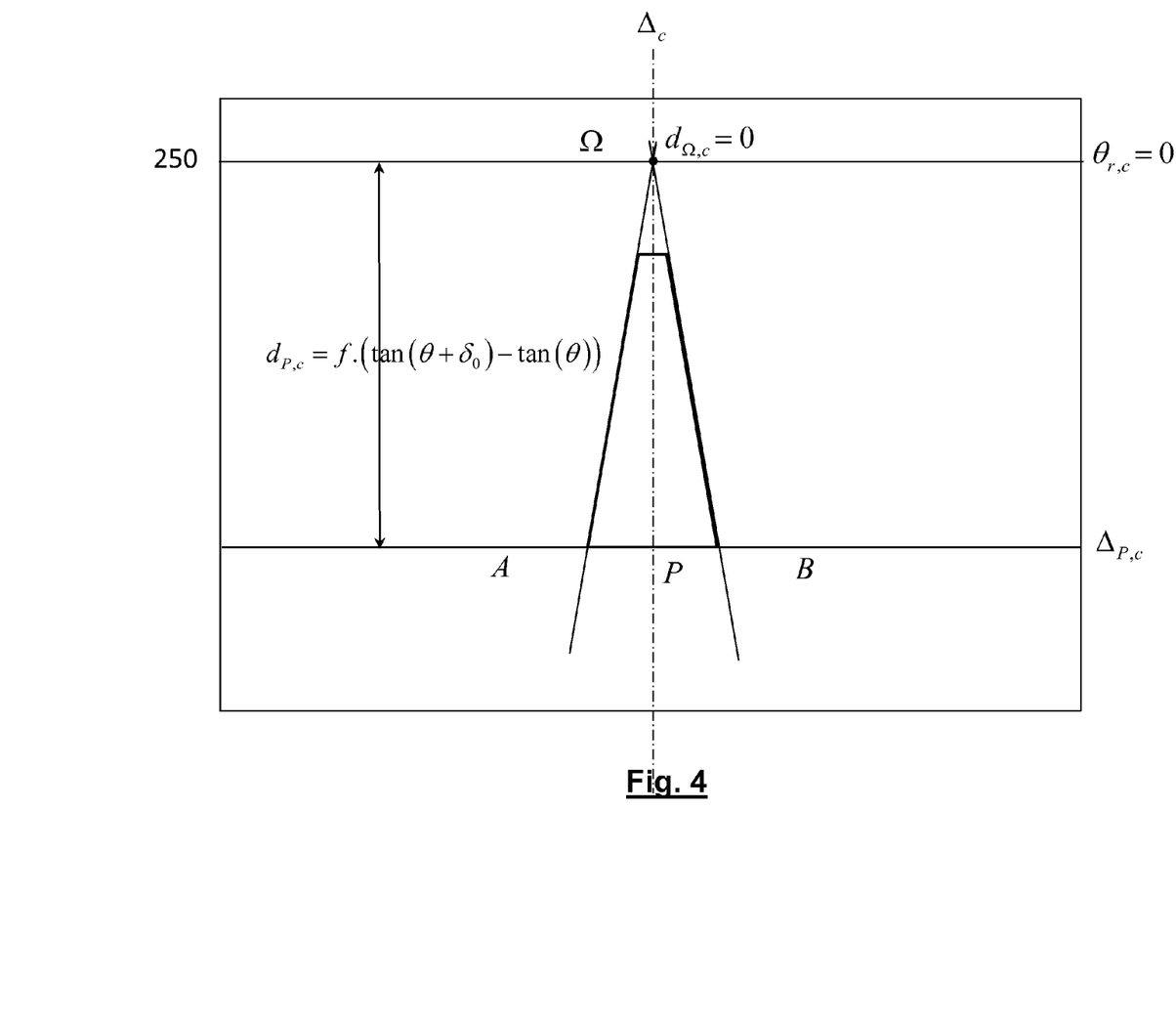
FIG. 4 represents the display screen when the visual features of the runway are controlled to their demand positions if there is no side wind.

Once the visual features of the landing runway have been identified in the image the visual servo estimates the distance between the positions of these elements in the image and the demand positions. In the example described above the visual servo estimates the distance between the axis of the runway, $\Delta$, and a first demand line identical to the median vertical axis of the image (if there is no side wind), firstly, and the distance between point P, and a second demand line, parallel to the horizon, located under the latter, at a demand distance $d_{P,c}$ as indicated in FIG. 4. The visual features of the runway have been represented on this figure when they are in their demand positions (the hypothesis of no side wind has been adopted). Axis of the runway $\Delta$ is identical to first demand line $\Delta^c$ and touchdown point P is located on second demand line $\Delta_{P,c}$. This second demand line is located at a distance $d_{P,c}$ under the horizon line. It will be understood that the distance between the positions of the visual features and their demand positions in the image is zero when the following conditions are checked:

$$\theta_r = \theta_{r,c} = 0 \text{ and } d_\Omega = d_{\Omega,c} = 0 \quad (3\text{-}1)$$

$$d_P = d_{P,c} = f \cdot (\tan(\theta+\delta_0) - \tan(\theta)) \quad (3\text{-}2)$$

where $\delta 0$ is the nominal angle between the approach plane and the ground, i.e. as a general rule $\delta_0 = 3°$, and $\theta$ is the aircraft's pitch angle. In certain cases, in particular emergency situations, angle $\delta_0$ can be directly entered by the pilot using interface 125.

It will be understood that condition (3-1) reflects the aircraft's side alignment constraint relative to the axis of the runway, and condition (3-2) reflects the vertical alignment constraint in the nominal approach plane. Condition (3-1) supposes that there is no side wind. If there is a side wind it is compensated by taking a non-zero demand value $d_{\Omega,c}$.

Of course, conditions other than (3-1) and (3-2) will be able to be envisaged to reflect the position distance relative to the demand. By this condition (3-1) could be replaced by the following condition:

$$|x_\Omega| + |x_P| = 0 \quad (4)$$

where $x_\Omega$ and $x_P$ are the respective abscissae of points $\Omega$ and P. In addition, if other visual features of the runway were taken into account those skilled in the art could find other conditions to express the lateral and vertical alignment constraints, without going beyond the scope of the subject matter disclosed herein. It is important to note that these conditions relate in this case solely to visual features of the runway in the image, and therefore do not require that the position, alignment or real dimensions of the runway are known. Only knowledge of pitch angle $\theta$ is required, and this is supplied by the inertial unit or by an inclinometer.

The visual servo calculates from the estimated distance guidance commands of the aircraft so as to bring the visual features of the runway to their respective demand positions.

For example, when conditions (3-1) and (3-2) are used to reflect the distance to the demand positions, the guidance commands are given by:

$$\dot{\phi}_c = k_1 \tan(\theta_r - \theta_{r,c}) + k_2 \operatorname{Arc} \tan(d_\Omega - d_{\Omega,c}) + k_3 \phi + k_4 \dot{\phi} \quad (5\text{-}1)$$

$$Nz_c = k_5(d_P - d_{P,c}) + k_6 \dot{d}_P \quad (5\text{-}2)$$

where $\dot{\theta}_c$ is the roll rate demand and $Nz_c$ the (vertical) load factor demand. It is noted that in the field of aerodynamics the load factor is the ratio of the apparent weight to the real weight. $\phi$ and $\dot{\phi}$ are respectively the roll angle and the instantaneous roll rate of the aircraft and $k_i$, i=1, . . . , 6 are predetermined real numbers.

It will thus be understood from equation (5-2) that if distance $d_P$ is greater than demand distance $d_{P,c}$, or if this distance increases, the visual servo sets a demand to increase the load factor so as to bring point P to demand line $\Delta_{P,c}$.

The guidance commands calculated in this manner are supplied to flight control computer 150. This then determines the commands to apply to the actuators of the flight control surfaces to satisfy the guidance commands. The automatic pilot can, in particular, use a law C* for longitudinal control, and a law Y* for transverse control, in a known manner.

By this, law C* controls the elevators by:

$$DQ=K_1 q+K_2 n_z+K_3\int(n_z-Nz_c)dt+K_4 Nz_c \quad (6\text{-}1)$$

where DQ is the command of the control surface actuator, $Nz_c$ is the previously calculated demand load factor, $n_z$ is the instantaneous load factor, q is the pitch speed and $K_1, \ldots, K_4$ are predetermined constants.

In a similar manner, law Y* controls the ailerons and the vertical stabilisers respectively by:

$$DP=k_{12}p+k_{13}r+k_{14}\phi+k_{15}\beta+k_{16}\dot{\phi}_c \quad (6\text{-}2)$$

$$DR=k_{21}p+k_{22}r+k_{23}\phi+k_{24}\beta+k_{25}\dot{\phi}_c \quad (6\text{-}3)$$

where DP and DR are respectively the control of the ailerons and of the vertical stabiliser, $\phi$ is the roll angle, p is the roll speed (where $p=\dot{\phi}-r\tan(\theta)$ where r is the yaw speed and $\theta$ the angle of trim), q is the pitch speed, $\beta$ is the angle of side-slip and coefficients $k_{ij}$ are predetermined constants. A detailed description of the abovementioned control laws can be found in an article by Farineau entitled "*Lateral electric flight control laws of the A320 based upon eigenstructure assignment techniques*" published in Proceedings of the AIAA GNC Conference, 2004.

The second scenario corresponds to an emergency landing situation, without any landing runway in sight. The image processor is then unable to identify a landing runway and, necessarily, the visual features of a runway. In this case the pilot selects, using interface 125, demand touchdown point P and axis Δ of the improvised runway, on the image displayed by display device 115. This selection can, for example, be made using a pen on a touchscreen, or alternatively using a mobile reticle and a confirmation key, firstly pointing at a touchdown point P and then at a point Q on demand axis Δ. Point P and axis Δ=(PQ) constitute the visual features of the improvised runway. They are tracked in the image by the image processor, and can then be highlighted on the screen of the display device, letting the pilot perform a visual check. Tracking of the visual features advantageously uses the aircraft's altitude and attitude data supplied by inertial unit 137.

As in the first scenario, the visual servo estimates the distance between the positions of the visual features (P,Δ) and their respective demand positions, and deduce the aircraft's guidance commands therefrom. The flight control computer determines the flight controls from the guidance commands, as set out above.

Figure 5:
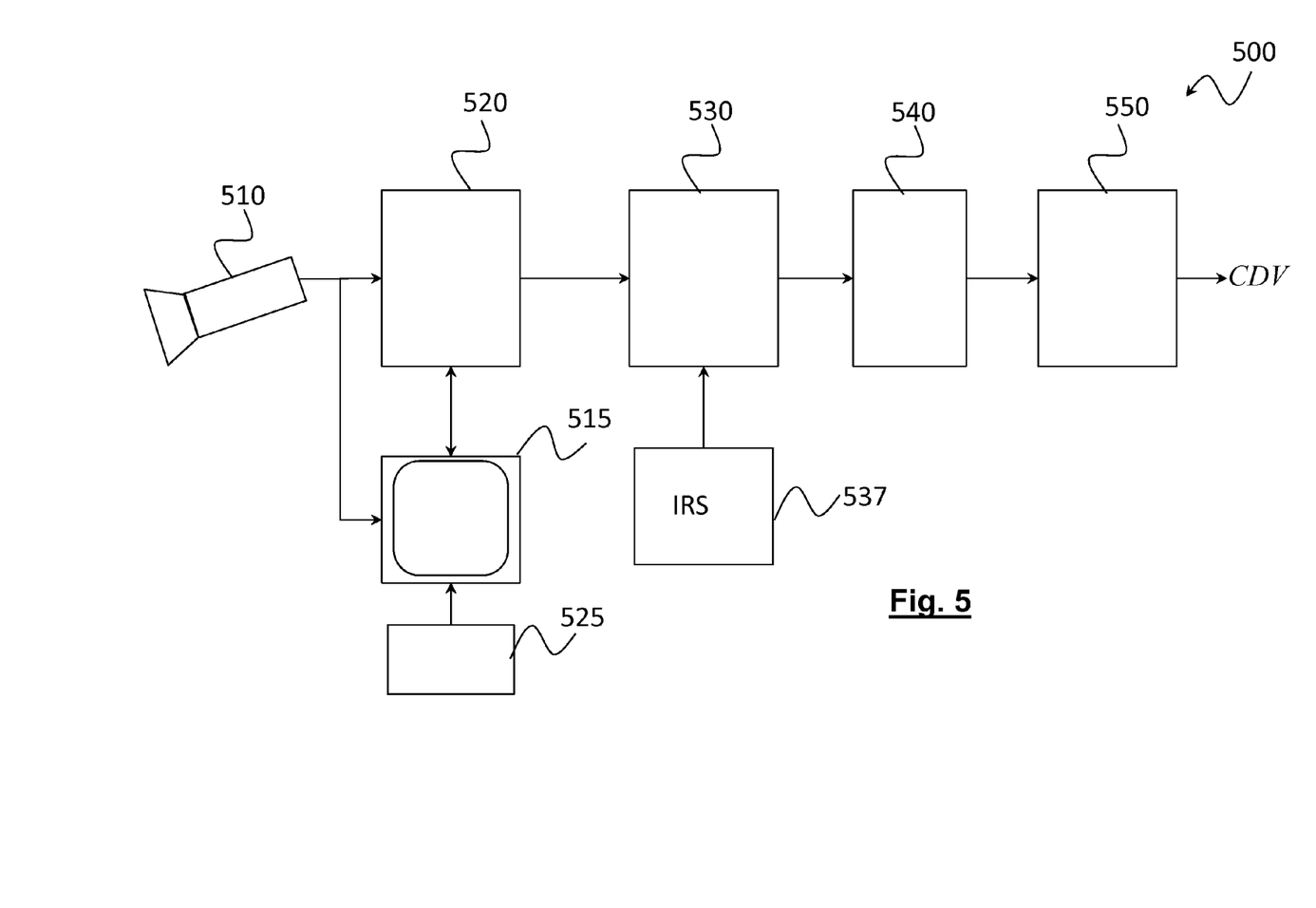
FIG. 5 represents an automatic landing system according to a second embodiment of the invention.

FIG. 5 represents an automatic landing system according to a second embodiment of the invention.

As in the first embodiment, landing system 500 includes at least one on-board video camera 510, image processor 520, to process video images of the ground supplied by the camera, and a display device 515 coupled to a user interface 525, to camera 510, and to image processor 520.

The landing runway can be detected by image processor 520, possibly following a selection by the pilot, or by data supplied by the control tower, as described above. Alternatively, the runway can be designated by the pilot on display device 515 by user interface 525.

Image processor 520 can also extract visual features of the landing runway and track them. The selected visual features of the runway are advantageously the touchdown point on the runway, shown in the image, and vanishing point Ω of the runway.

Unlike the first embodiment, the second embodiment includes estimator 534 for estimating the position of the aircraft relative to the runway. This relative position as defined by a vertical distance Δz (height of the aircraft relative to the runway), a longitudinal distance Δx (distance of the aircraft to the touchdown point, with the axis of the runway), and a lateral or transverse distance Δy (distance of the aircraft to the vertical plane passing through the axis of the runway). The position of the aircraft relative to the runway is estimated from the positions of the visual features in at least two successive images of the runway, and from positional data of the aircraft supplied by inertial unit 537. The term "successive images" is understood to mean two images separated by one or more period(s) at video rate. It is possible for the estimate to be made only every n periods, where n is chosen as a function of the computation capacity of the estimator, the precision required for the relative position, the video rate and the speed of the aircraft.

Relative position estimator 530 transmits the vertical, Δz, longitudinal, Δx, and transverse, Δy, distances to a guidance computer 540. This guidance computer can be that of an ILS (Instrument Landing System), GLS (GPS Landing System) or SLS (Satellite Landing System). This computer calculates a guidance law, i.e. the nominal trajectory which the aircraft must follow during the approach. The nominal trajectory is contained in the vertical plane passing through the axis of the runway and the nominal approach plane.

Guidance computer 540 calculates the deviation of the aircraft relative to the nominal trajectory, and from it deduces the guidance commands to bring the aircraft to this trajectory. These guidance commands are then transmitted to a flight control computer 650 calculating the controls to be applied to the actuators of the flight control surfaces to perform the guidance commands.

Figure 6A:
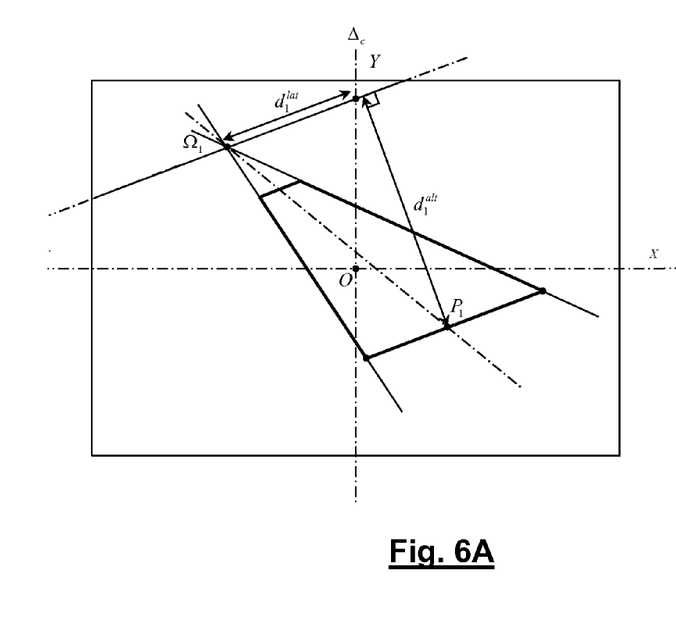
FIGS. 6A and 6B represent visual features of the runway for two successive video images.
Figure 6B:
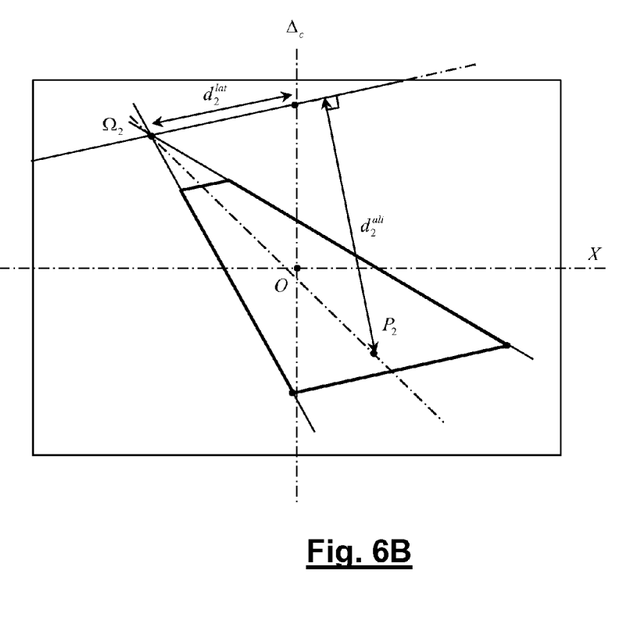

FIGS. 6A and 6B represent two successive video images of the ground. It is supposed that the landing runway has been previously detected by image processor 520. In these two images the visual features of this runway have also been represented, namely the point representing the touchdown point (point $P_1$ in FIG. 6A and $P_2$ in FIG. 6B) and the vanishing point of the runway ($\Omega_1$ in FIG. 6A and $\Omega_2$ in FIG. 6B) extracted by the image processor. The respective distances between points $P_1$, $P_2$ and horizon line 250 are noted $d_1^{alt}$, $d_2^{alt}$. Similarly, the respective distances between points $\Omega_1$, $\Omega_2$ and axis of symmetry OY are noted note $d_1^{lat}$, $d_2^{lat}$.

Figure 7:
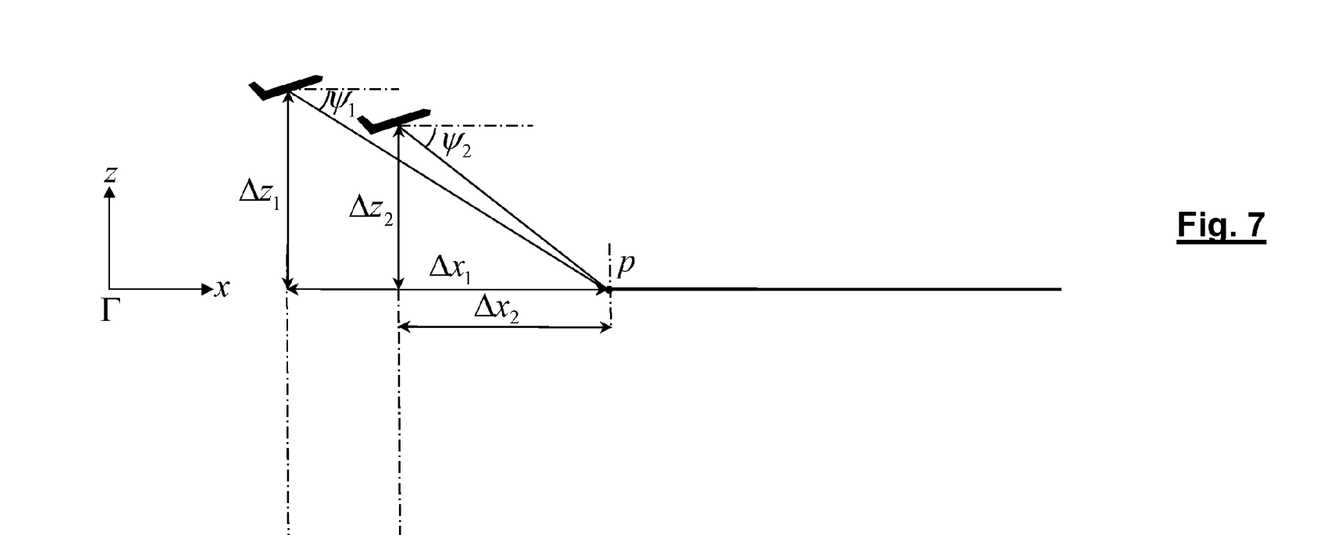
FIGS. 7 and 8 illustrate a side view and a top view of the position of the aircraft relative to a landing runway.
Figure 8:
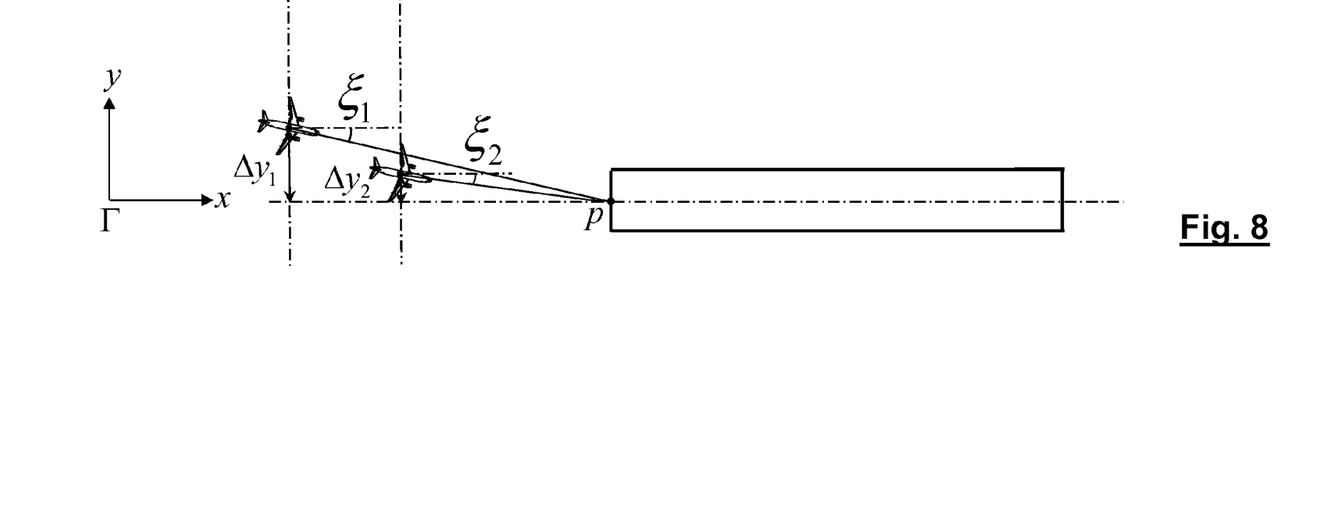

In FIG. 7 a side view of two successive positions of the aircraft in the approach phase have been represented, corresponding respectively to the instants at which the images of FIGS. 6A and 6B were taken. Similarly, in FIG. 8 a top view of the same two positions of the aircraft have been represented. In FIGS. 7 and 8 the touchdown point has been indicated by p. This point is represented by point $P_1$ in the image of FIG. 6A and point $P_2$ in the image of FIG. 6B.

Conventionally a reference point (Γ,x,y,z) is taken, where axis Γx is the axis of the runway, where axis Γy is transverse to the runway and axis Γz is the vertical axis.

The longitudinal and vertical distances of the aircraft relative to the runway have been represented in FIG. 7 by $\Delta x_1$ and $\Delta z_1$ for the first position of the aircraft and $\Delta x_2$ and $\Delta z_2$ for the second position of the aircraft. Similarly, the longitudinal and lateral distances of the aircraft relative to the runway have been represented in FIG. 8. The lateral distances have been noted $\Delta y_1$ and $\Delta y_2$ respectively for the first and second positions of the aircraft. The differences of the longitudinal, lateral and vertical distances between the two positions have been noted $\Delta x_{12}$, $\Delta y_{12}$ and $\Delta z_{12}$. There are then the following relationships, in the lateral view:

$$\tan\psi_1 = \frac{d_1^{alt}}{f} = \frac{\Delta z_1}{\Delta x_1} \quad (7\text{-}1)$$

$$\tan\psi_2 = \frac{d_2^{alt}}{f} = \frac{\Delta z_2}{\Delta x_2} \quad (7\text{-}2)$$

where $\psi_1$, $\psi_2$ are the angles of elevation of point p in the first and second positions.

In a similar manner, there are then the following relationships in the top view:

$$\tan\xi_1 = \frac{d_1^{lat}}{f} = \frac{\Delta y_1}{\Delta x_1} \quad (8\text{-}1)$$

$$\tan\xi_2 = \frac{d_2^{lat}}{f} = \frac{\Delta y_2}{\Delta x_2} \quad (8\text{-}2)$$

It can be shown by simple trigonometrical relationships that the position of the aircraft relative to the runway can be obtained by the following expressions:

$$\Delta z_2 = \frac{(x_2 - x_1) - (z_2 - z_1)/\tan\psi_1}{1/\tan\psi_2 - 1/\tan\psi_1} \quad (9\text{-}1)$$

$$\Delta y_2 = \frac{(x_2 - x_1) - (y_2 - y_1)/\tan\xi_1}{1/\tan\xi_2 - 1/\tan\xi_1} \quad (9\text{-}2)$$

$$\Delta x_2 = \frac{\Delta z_2}{\tan\psi_2} \quad (9\text{-}3)$$

where $x_2-x_1$, $y_2-y_1$, $z_2-z_1$ give the movement of the aircraft in reference point ($\Gamma$,x,y,z) between the first and second positions. It is observed that the expressions (9-1), (9-2) and (9-3) require only that the movement of the aircraft is known, and not the exact positions of the aircraft in these two positions. The movement can in this manner be provided by the initial unit, since the bias of the inertial drift does not affect the calculation.

Thus, in the first scenario, after the landing runway has been detected by image processor 520, and the position of the aircraft relative to the runway has been estimated by estimator 530, the aircraft is guided along its nominal trajectory by guidance system 540. It will be noted that, as in the first embodiment, knowledge of the features of the runway (dimensions, position, alignment) is not required.

Finally, the second embodiment can also be used in the second scenario (emergency landing on an improvised runway). To accomplish this the pilot uses user interface 525 to designate the demand touchdown point P and the direction of the runway, for example by designating a second point Q of the axis of the demand runway. The automatic landing system guides the aircraft along the nominal approach trajectory to land on this runway.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The invention claimed is:

1. A system for automatic landing of an aircraft on a landing runway, the system comprising:
   at least one on-board video camera on board the aircraft, wherein the on-board video camera is configured to take a series of successive images of the ground;
   an image processor configured to extract from the images visual features of the landing runway; and
   a guidance system configured to:
      determine a horizon line for a first image of the series of successive images;
      determine a respective demand position for an axis ($\Delta$) of the landing runway and a touchdown point (P) on the landing runway in the first image to bring the aircraft into a nominal approach plane and to align the aircraft with the axis of the landing runway, wherein the demand position of the axis of the landing runway is based on a median vertical axis of the image, and wherein the demand position of the touchdown point is the point of intersection between the median vertical axis and a line parallel to the horizon line and located under the horizon line at a demand distance from the horizon line;
      estimate the distance between the positions of the visual features and the demand positions of the visual features in the first image; and
      determine guidance commands of the aircraft based on the estimated distances between the positions of the visual features and the demand positions of the visual features in the first image to bring the visual features to their respective demand positions in the first image.

2. The automatic landing system of claim 1, wherein the guidance system is configured to estimate the distance between the axis of the runway and the median vertical axis of the image by distance $d_\Omega$ separating vanishing point $\Omega$ and point of intersection H between the median vertical axis of the image and the horizon line, and angle $\theta_r$ between the axis of the runway and a horizontal axis of the image.

3. The automatic landing system of claim 2, wherein the demand position for the touchdown point is equal to $d_{P,c}=f\cdot(\tan(\theta+\delta_0)-\tan(\theta))$ where f is the focal distance of the camera, $\theta$ is the aircraft's pitch angle and $\delta_0$ is the angle between the nominal approach plane and the horizontal plane.

4. The automatic landing system of claim 2, wherein the guidance system is configured to determine the guidance commands of the aircraft by:

$$\dot{\phi}_c = k_1 \tan(\theta_r - \theta_{r,c}) + k_2 \operatorname{Arc}\tan(d_\Omega - d_{\Omega,c}) + k_3\phi + k_4\dot{\phi}$$

$$Nz_c = k_5(d_P - d_{P,c}) + k_6\dot{d}_P$$

where $\dot{\phi}_c$ is the demand roll speed, $Nz_c$ is the demand load factor, $\phi$ and $\dot{\phi}$ are respectively the instantaneous roll angle and roll speed of the aircraft, and $k_i$, i=1, . . . , 6 are predetermined real numbers, $\theta_{r,c}=0$ and $d_{\Omega,c}$ is a set point value.

5. The automatic landing system of claim 4, wherein demand value $d_{\Omega,c}$ is an increasing function of the side wind speed, and zero if no such wind is present.

6. The automatic landing system of claim 1, wherein the image processor is configured to identify at least one landing runway in one image.

7. The automatic landing system of claim 6, comprising a display device to display the images of the on-board video camera, coupled to a user interface, wherein the user interface enables a visual indicator of a first landing runway to be selected from multiple landing runways in an image displayed by the display device.

8. The automatic landing system of claim 6, wherein the image processor is configured to determine the axis of the landing runway and the touchdown point on the landing runway.

9. The automatic landing system of claim 1, comprising a display device to display the images of the video camera, coupled to a user interface, where the user interface enables the axis of the landing runway to be designated on the image, together with a touchdown point on this runway.

10. A method performed by a guidance computer for automatic landing of an aircraft on a landing runway, the method comprising:

taking, using an on-board video camera, a successive series of images of the ground;

using image processing software to extract from the images visual features of the landing runway;

determining a horizon line for a first image of the series of successive images;

determining a respective demand position for an axis ($\Delta$) of the landing runway and a touchdown point (P) on the landing runway in the first image to bring the aircraft into a nominal approach plane and to align the aircraft with the axis of the landing runway, wherein the demand position of the axis of the landing runway is based on a median vertical axis of the image, and wherein the demand position of the touchdown point is the point of intersection between the median vertical axis and a line parallel to the horizon line and located under the horizon line at a demand distance from the horizon line;

estimating the distance between the positions of the visual features and the demand positions of the visual features in the first image; and determining guidance commands of the aircraft based on the estimated distances between the positions of the visual features and the demand positions of the visual features in the first image to bring the visual features to their respective demand positions of the visual features in the first image.

* * * * *